Aug. 7, 1934.  T. R. ARDEN  1,968,804

MOTOR STARTING DEVICE

Original Filed Jan. 20, 1932

Inventor
T. R. Arden,
By D. P. Wolhaupter
Attorney

Patented Aug. 7, 1934

1,968,804

UNITED STATES PATENT OFFICE 1,968,804

MOTOR STARTING DEVICE

Thomas Raymond Arden, Baldwin, N. Y., assignor to American Flyer Manufacturing Company, Chicago, Ill., a corporation of Illinois Original application January 20, 1932, Serial No. 587,828. Divided and this application November 25, 1932, Serial No. 644,380

6 Claims. (Cl. 172—279)

This invention relates to a motor starter of a mechanical, manually operable type, and has generally in view to provide a simple, reliable and efficient motor starter of this type which is capable of varied uses, but which possesses special utility when associated with and used for starting the synchronous motors of electric clocks of the type described and claimed, for example, in my prior patent, No. 1,838,069, dated December 22, 1931, and in copending application, Serial #587,828, of which this application is a division.

A special object of the invention is to provide a motor starter embodying a spring which is, manually energizable and which acts when released to operate the starter, thereby to obtain the advantage that the starter always imparts to the motor a substantially unvarying impulse the strength of which is predetermined to place the motor in step with the alterations of the operating current therefor, thus to avoid the difficulties heretofore encountered in the starting of synchronous clock and other motors to which the starter is applicable.

According to my aforesaid application, Serial No. 587,828, there is disclosed an electric clock which is inclusive of a synchronous clock operating motor and an alarm circuit controlling centrifugal switch which is mounted on the motor shaft and frictionally coupled to the motor armature to be driven thereby and to constitute an inertia member therefor. Thus, while the switch normally is rotatable with the motor, nevertheless it also is rotatable with respect thereto, and due to its inertia when the motor is at rest, would constitute an obstacle to bringing the motor to a speed in which it is in step with the alternations of the supplied current if it were not rotated in harmony with the motor during starting of the latter. Accordingly, another special object of the invention is to provide a motor starter embodying a special design whereby equal and simultaneous starting impulses are imparted to the motor and to the inertia member or centrifugal switch device in instances where such a member or device is associated with the motor, thus to eliminate the inertia member or switch device as an obstacle to starting of the motor.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in the different views:—

Figure 1:
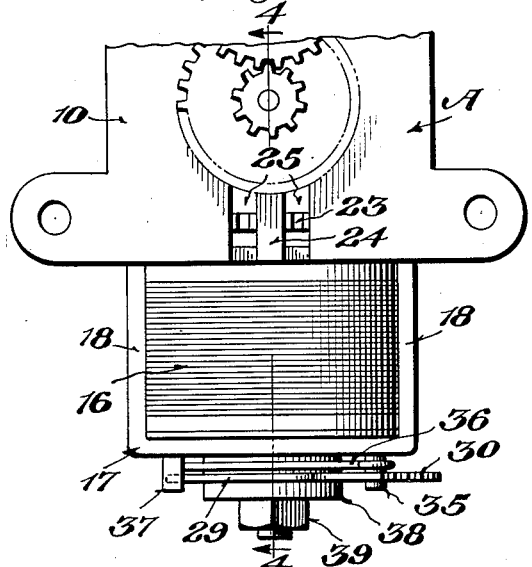
Figure 1 is a fragmentary front elevation of an electric clock having a synchronous motor and a starter therefor embodying the features of the invention.
Figure 2:
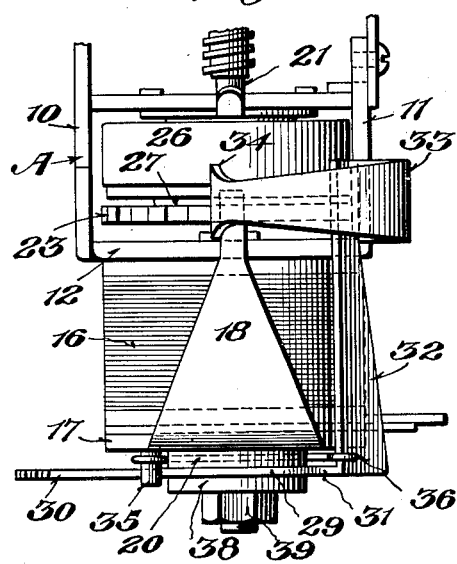
Figure 2 is a side elevation of the parts shown in Fig. 1.
Figure 3:
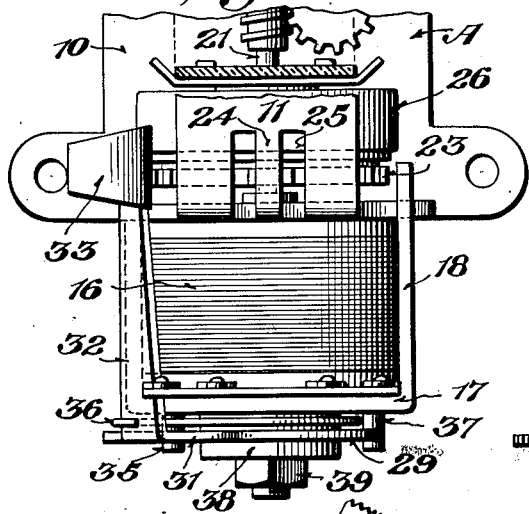
Figure 3 is a rear elevation.
Figure 4:
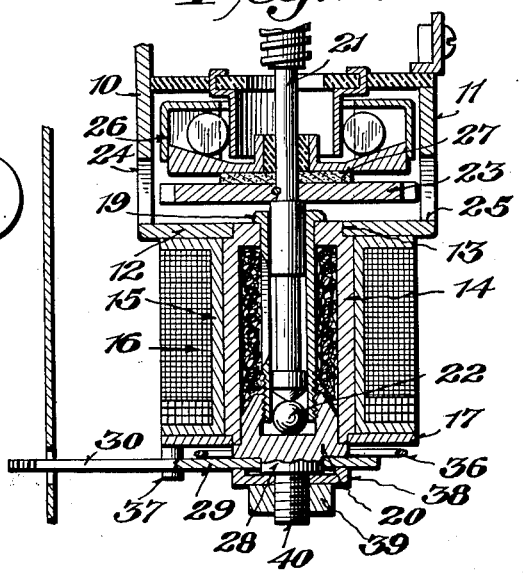
Figure 4 is a central vertical section on the line 4—4 of Fig. 1.
Figure 5:
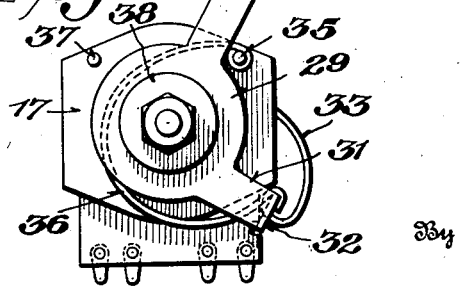
Figure 5 is a bottom plan view.

Referring in detail to the practical embodiment of the invention illustrated in the drawing, A designates generally a U-shaped frame which is inclusive of a front plate portion 10, a rear plate portion, and a bottom plate portion 12 connecting the plate portions 10 and 11 and having formed therein a relatively large opening 13.

Fitted tightly at its upper end within the opening 13 is a core 14 on which is disposed a spool 15 carrying a motor winding 16, while suitably secured to the lower end of said core is a U-shaped pole piece 17 which is disposed at right angles to the frame A and which is inclusive of a pair of arms or pole pieces 18, 18 which extend upwardly at opposite sides of the winding 16 and terminate at their upper ends somewhat above the bottom plate 12 of the frame A.

Extending downwardly through the core 14 is a tube 19 which is provided at its upper end with a shoulder seated against the top face of the core and which is externally screw threaded at its lower end for threaded engagement with a nut 20 which is shouldered to seat against the bottom face of the core. The tube fits neatly within a hole in the top of the core 14, and a portion of the nut 20 fits neatly within the lower end of the core. Therefore, when the nut is tightened the tube is secured firmly in assembly with the core coaxially thereof.

Extending downwardly into the tube 19 and rotatably journaled therein is a vertical motor shaft 21 which seats at its lower end against a thrust bearing in the form of a ball 22 retained in the lower end of the tube by the nut, and which has fixed thereto, as short distance above the bottom plate 12 of the frame A, an armature disk 23 which is peripherally toothed for cooperation with the pole pieces 18, 18 and with other right angularly disposed pole pieces 24, 24 formed by and between pairs of slots 25 in the front and rear portions 10 and 11 of the frame A, whereby energization of the winding 16 by an alternating current produces rotation of the armature and its shaft in a well known manner.

A combined centrifugal switch and motor inertia member 26 is mounted on the shaft 21 for rotation with respect thereto and rests on a friction disk 27 disposed on top of the armature disk 23 whereby, normally, it rotates with said armature disk. The details of this switch and inertia member—it may be either or a combination of both—are fully described in my aforesaid application, Serial No. 587,828, and as they do not in themselves constitute any part of the present invention, it is not necessary to describe them here, except to point out that the casing or body of the member 26 is of circular shape and of slightly less diameter than the armature disk 23.

Referring now particularly to the present motor starting device, it will be observed that on a reduced portion of the nut 20 affording a hub 28, is rotatably mounted a substantially L-shaped lever 29, one arm 30 of which constitutes a finger engageable operating arm for the starting device and the other arm 31 of which is provided with a vertical extension 32 which reaches to the body or casing of the member 26 and which, at its upper end, carries a laterally extending resilient finger 33 the free end portion of which is directed inwardly towards the armature disk 23 and the member 26 as indicated at 34.

At 35 is designated a stop pin projecting downwardly from the bottom of the pole piece 17, while at 36 is designated a bowed spring which is fastened at one end to the lever 29 and at its other end to said stop pin 35, whereby it tends constantly to urge the lever arm 31 against said stop pin and to return said arm to this position whenever the arm is moved away from said pin and subsequently released.

When the lever 29 is in its normal position with the arm 30 thereof against the stop pin 35, the spring finger 33 overlies and engages one of the pole pieces 18 and by said pole piece is held spaced outwardly with respect to the armature disk 23 and the member 26. When, however, the lever arm 30 is swung away from the stop pin 35 against the force of the spring 36, the finger 33 is moved to a position where it is no longer restrained by the pole piece 18 against inward movement and as a consequence the free end portion 34 thereof, by reason of the inherent resiliency of the finger springs inwardly and engages the periphery of the member 26 and at the same time enters one of the peripheral recesses in the armature disk 23. Thus, when the arm 30 of the lever 29 is released, the spring 36 operates quickly to return the lever to its normal position against the stop pin 35 with the result that by reason of the engagement of the end 34 of the finger 33 with the member 26 and the motor armature disk 23, a starting impulse is imparted both to the member and the disk.

Immediately before the lever arm 30 reaches the pin 35 during its return movement by the spring 36, the finger 33 engages the pole piece 18 and by said pole piece is forced outwardly away from the member 26 and the armature disk 23, whereby these parts are free to rotate without interference by the starting device when return of the lever 29 to its normal position is completed.

A second stop pin 37 projects downwardly from the pole piece 17 to predetermine the amount of permissible swinging movement of the lever arm 30 away from the stop pin 35. Consequently, assuming that whenever the starting device is used the arm 30 is swung against the pin 37, it follows that the spring always is energized the same amount and therefore the starting impulse is always the same. Thus, the uncertainties and difficulties heretofore experienced in the starting of motors of the present general type are effectively eliminated, and it has been found that by the use of a proper spring 36 to impart the desired rotative impulse at the proper speed, the motor invariably starts following a single manipulation of the starter.

The lever 29 is retained on the hub 28 by a washer 38 and a nut 39 threaded on a reduced extension 40 of the nut 22.

From the foregoing description considered in connection with the accompanying drawing it is believed that the construction, operation and advantages of the invention will be clearly understood. It is desired to point out, however, that while only a single specific embodiment of the invention has been illustrated and described, the same is readily capable of embodiment in various other specifically different mechanical structures within the spirit and the scope thereof as defined in the appended claims.

I claim:—

1. In mechanism of the class described, a synchronous motor inclusive of a rotor, a pivoted lever having a normal position, spring means to return said lever to its normal position following movement of the lever away from such position, a resilient member carried by the lever for engagement with the rotor when the lever is moved away from its normal position, means whereby return of the lever to its normal position by said spring means imparts starting rotation to the rotor, and fixed means with which said member is engageable upon return movement of said lever for disengaging said member from the rotor as the lever approaches and prior to the same reaching its normal position.

2. In mechanism of the class described, a synchronous motor inclusive of a rotor, a pivoted lever having a normal position, spring means to return said lever to its normal position following movement of the lever away from such position, a spring finger carried by the lever for engagement with the rotor when the lever is moved away from its normal position, means whereby return of the lever to its normal position by said spring means imparts starting rotation to the rotor, and fixed means with which said member is engageable upon return movement of the lever to disengage the finger from the rotor as the lever approaches and prior to the same reaching its normal position.

3. In mechanism of the class described, a synchronous motor inclusive of a rotor, a member rotatable with said rotor and also with respect thereto, a lever having a normal position, spring means to return said lever to its normal position following movement of the same away from such position, a finger carried by said lever for engagement with said member and said rotor when the lever is moved from its normal position whereby return of the lever to its normal position effects rotation of said member and rotor, and means to disengage said finger from said member and rotor as the lever aproaches its normal position.

4. A synchronous motor including a rotor, an inertia member rotatable with and also with respect to said rotor, and starting means for the motor operable to impart equal starting impulses to the rotor and the inertia member separately and simultaneously.

5. A synchronous motor including a rotor, an inertia member rotatable with and also with respect to said rotor, and manually energizable spring means operable to impart equal starting impulses to the rotor and the inertia member separately and simultaneously.

6. A synchronous motor including a rotor, an inertia member rotatable with and also with respect to said rotor, a pivoted lever having a normal position, yieldable means to return said lever to its normal position following movement of the lever away from such position, means carried by said lever for engagement with the rotor and said inertia member when the lever is moved away from its normal position whereby return of the lever to its normal position imparts equal starting impulses to the rotor and the inertia member simultaneously, and positively acting means to assure disengagement of said first named means from the rotor and the inertia member when the lever is returned to its normal position.

THOMAS RAYMOND ARDEN.